(12) United States Patent
Heller

(10) Patent No.: US 6,297,743 B1
(45) Date of Patent: Oct. 2, 2001

(54) FORCE-RESPONSIVE DETECTORS AND SYSTEMS

(75) Inventor: Norbert Heller, Grefrath (DE)

(73) Assignee: GenCorp Property Inc., Rancho Cordova, CA (US)

( * ) Notice: Subject to any disclaimer, the term of this patent is extended or adjusted under 35 U.S.C. 154(b) by 0 days.

(21) Appl. No.: 09/486,246

(22) PCT Filed: Oct. 29, 1998

(86) PCT No.: PCT/GB98/03239

§ 371 Date: Apr. 25, 2000

§ 102(e) Date: Apr. 25, 2000

(87) PCT Pub. No.: WO99/27219

PCT Pub. Date: Jun. 3, 1999

(30) Foreign Application Priority Data

Nov. 22, 1997 (GB) .................................................. 9724643

(51) Int. Cl.⁷ .................................................. G08B 21/00
(52) U.S. Cl. ........................ 340/665; 180/286; 200/85 R; 318/466
(58) Field of Search .......................... 340/665; 307/10.1; 180/286; 200/85 R, 61.59; 318/445, 466; 73/862.381, 862.53, 862.621, 862.625, 862.636, 862.637

(56) References Cited

U.S. PATENT DOCUMENTS

| | | | |
|---|---|---|---|
| 3,825,277 | 7/1974 | Steinback | 200/86 R |
| 4,013,851 | * 3/1977 | Abbondante | 200/86 R |
| 4,080,519 | 3/1978 | Michalson | 200/86 R |
| 4,575,601 | * 3/1986 | Taguchi et al. | 219/685 |
| 4,963,705 | * 10/1990 | Broderick | 200/86 R |
| 5,192,837 | 3/1993 | Chardon | 200/61.41 |
| 5,435,409 | 7/1995 | Meyer et al. | 180/274 |
| 5,512,716 | * 4/1996 | Buchien | 200/85 R X |
| 5,728,983 | * 3/1998 | Ishihara et al. | 200/61.43 |

FOREIGN PATENT DOCUMENTS

| | | |
|---|---|---|
| 2 157 597 | 5/1973 | (DE) . |
| 44 27 537 | 2/1996 | (DE) . |
| 0 392 736 | 10/1990 | (EP) . |
| 0 454 269 | 10/1991 | (EP) . |
| 2 564 971 | 5/1984 | (FR) . |
| 1 516 004 | 6/1978 | (GB) . |
| 2 095 036 | 9/1982 | (GB) . |
| 2 300 444 | 11/1996 | (GB) . |
| 90/10204 | 9/1990 | (WO) . |

* cited by examiner

Primary Examiner—Thomas Mullen
(74) Attorney, Agent, or Firm—Leydig, Voit & Mayer, Ltd.

(57) ABSTRACT

A safety system, such as for detecting obstructions in a window opening having a motor-slidable window glass (32) and for arresting the window glass in the presence of such an obstruction, comprises a glass-receiving channel (34). The base (48) defines a hollow chamber (60) incorporating a sensor (62). The sensor supports two substantially parallel longitudinally extending force-responsive sensing units (12, 14) each positioned immediately adjacent to a respective one of the side walls (44, 46) of the channel (34). If an obstruction in the window opening is carried upward by the slidable window pane (32), it will apply a force to the distal edge of one or both of the side walls (44, 46) and this force will be transmitted to the respective sensing unit (12, 14). Electrically conductive strips of the relevant sensing unit (12, 14) move into contact to produce an electrical signal which arrests the window glass. A third, similar, sensing unit (13) of the sensor (62) is positioned to produce a corresponding electrical signal when a force is applied to it by the distal edge of the closing window glass. This is used to indicate completion of travel of the window glass.

20 Claims, 3 Drawing Sheets

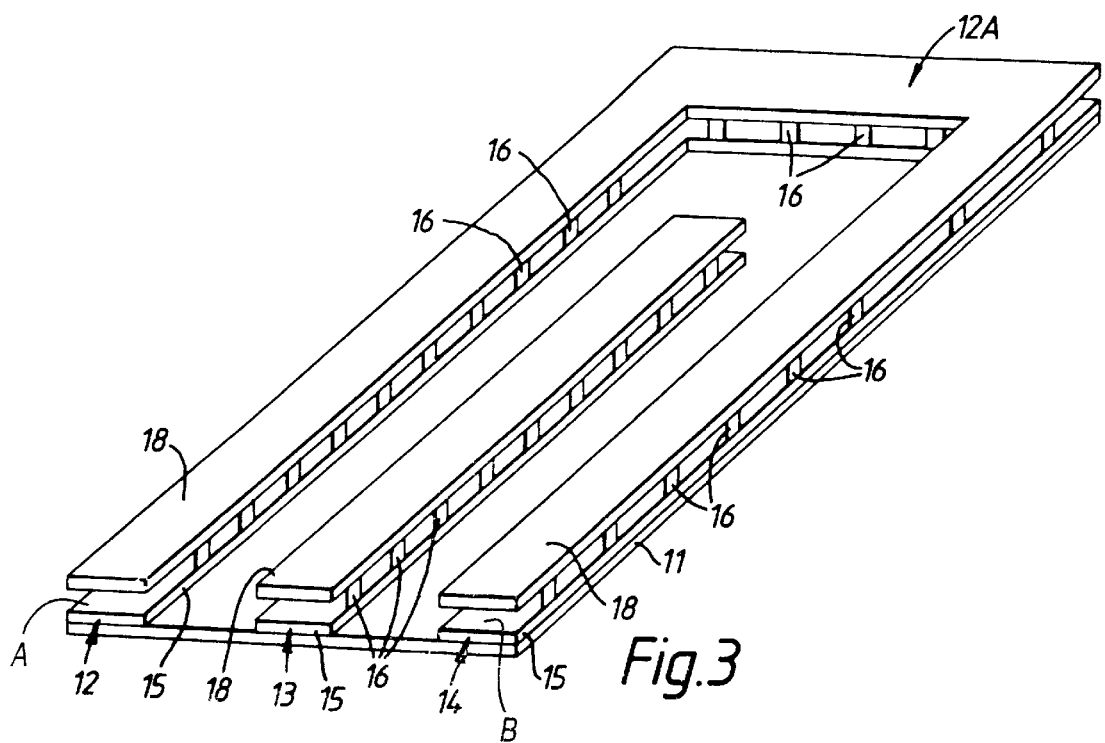
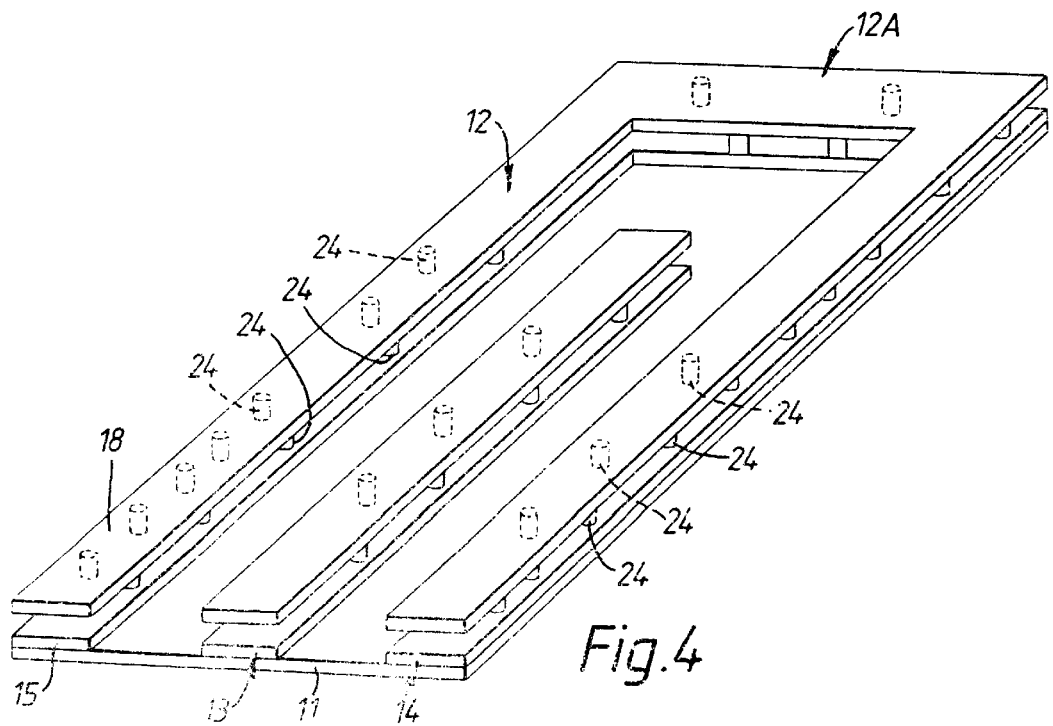

FORCE-RESPONSIVE DETECTORS AND SYSTEMS

BACKGROUND OF THE INVENTION

The invention relates to a force-responsive longitudinally extending sensor, comprising a flexible longitudinally extending support having a predetermined width, first and second sensing means mounted on the support and spaced apart across the width of the support and extending therealong in substantially parallel configuration so as each to produce a respective signal in response to a respectively applied force.

Such sensors may be used, for example, in motor vehicles for detecting the presence of an obstruction in a window opening closable by a motorised window pane. However, such sensors may be used in many other applications.

DESCRIPTION OF THE PRIOR ART

One form of such a sensor is shown in DE-A-21 57 597. Here, the support comprises a channel-shaped window-glass receiving and sealing channel, the first and second sensing means being respectively positioned on and running along the two distal edges forming the longitudinal mouth of the channel. With such an arrangement, the two sensors must be separately mounted on the channel edges. If this is done after insertion of the channel into its rigid mount, two separate operations are necessary. If the sensors are mounted on the channel before the channel is mounted in its rigid frame, the sensors may be liable to damage during handling.

The invention aims to deal with these problems.

BRIEF SUMMARY OF THE INVENTION

According to the invention, therefore, the sensor as first set forth above is characterised in that the support is a substantially planar base.

DESCRIPTION OF THE DRAWINGS

Force-responsive sensors and systems embodying the invention, and window safety systems embodying the invention and for use in motor vehicles, will now be described, by way of example only, with reference to the accompanying diagrammatic drawings in which:

FIG. 3 is a perspective view of part of another of the sensors;

FIG. 4 is a perspective view of part of a further one of the sensors;

DESCRIPTION OF PREFERRED EMBODIMENTS

Figure 1:
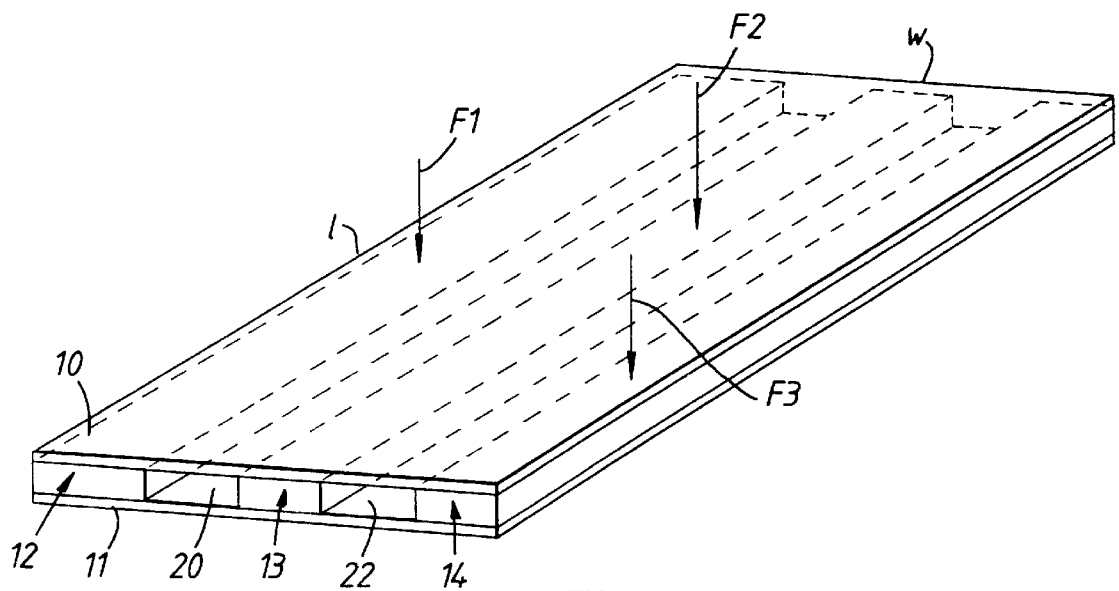
FIG. 1 is a perspective view of one of the sensors.

The sensor shown in FIG. 1 is of indeterminate length l and predetermined width w. In a manner to be explained and in response to a force applied to the sensor at individual predetermined points along its surface, and in a direction perpendicular, or at least transverse, to the plane lw, it produces an electrically detectable signal.

The sensor has a rectangular cover layer 10 which is made of flexible and resilient electrically insulating material and extends over the entire upper surface (as viewed in FIG. 1) of the sensor.

A base layer 11 is positioned along the undersurface of the sensor; the layer 11 is made of similar material to that of the cover layer 10. Between the layers 10,11 three separate strip-like sensing units 12,13 and 14 are mounted. Units 12 and 14 are mounted along opposite longitudinal edges of the sensor and unit 13 is mounted between them. FIG. 1 shows these units only diagrammatically. One such unit is shown to an enlarged scale in FIG. 2; the others are the same.

Figure 2:
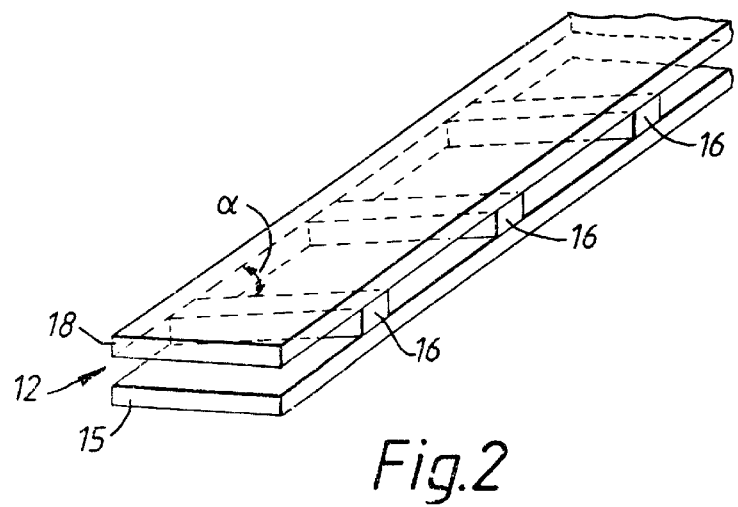
FIG. 2 is an enlarged perspective view of a sensing unit in the sensor of FIG. 1.

As shown in FIG. 2, the unit comprises an electrically conductive layer 15 mounted on the cover layer 11. Layer 15 extends along the length l but only for a small part of the width w. The layer 15 is advantageously in the form of an electrically conductive film which may be formed by a printed circuit technique on the layer 11. A series of electrically insulating spacers 16 each of narrow strip form is mounted on the conductive layer 15. The spacers 16 extend generally widthwise but slanted across the layer 15 and are positioned at regular intervals along the layer, each spacer 16 being at an angle a to the length of the strip. The spacers 16 can be applied by a printed circuit technique.

A further electrically conductive layer 18 lies over the conductive layer 15, so as to be placed on top of the insulating spacers 16. The cover layer 10 overlays the conductive layer 18.

The conductive layers 18 can be in the form of electrically conductive films applied by a printed circuit technique.

The layers 10,11, and the electrically conductive layers 15 and 18 are flexible. However, the resilience of the conductive layers is such that the layers 15 and 18 of each sensing unit 12,13,14 are normally held apart by (that is, electrically insulated by) the insulating spacers 16.

In operation, a force applied in the direction of the arrow F1,F2 or F3 (FIG. 1) will flex the cover layer 10, and this in turn will flex the electrically conductive layer 18 of the appropriate one of the sensing unit 12,13,14, so as to bend it into electrical contact with the respective one of the layers 15. This electrical contact can be electrically detected to produce an output signal.

Clearly, if the force F1,F2 or F3 is applied immediately over one of the insulating spacers 16, it is possible that no electrical signal will be produced. In practice, therefore, the spacing between the insulators 16 is selected to be sufficiently large in relation to the size of the spacers 16 as to produce the required sensitivity of force detection.

A force applied to the cover layer 10 within one of the regions 20,22 (FIG. 1) between the sensing units 12,13,14 will not normally produce an electrical signal—unless it is sufficiently close to one of the layers 18 to press such layer into electrical contact with the corresponding layer 15.

Normally, the construction of the sensor is such that forces correspondingly positioned to the forces F1,F2 and F3 but applied to the base sheet 11 from the opposite direction will also produce electrical signals.

FIG. 3 shows a modification to the sensor of FIG. 1. For ease of illustration, FIG. 3 omits the over layer 10. As shown, the sensor of FIG. 3 differs from that of FIG. 1 in that, at one end of the sensor, the sensing unit 12 has an integral portion 12A extending widthwise across the sensor towards and into integral connection with the sensing unit 14, so that the conductive layers 15 of these two sensing units are connected as are their conductive layers 18.

The sensor illustrated in FIG. 4 is substantially the same as the sensor illustrated in FIG. 3. The only difference is that the strip-like spacers 16 of FIGS. 1,2 and 3 are replaced by multiple small cylindrical or disc-shaped insulators 24, only some of which are shown in the Figure. Otherwise, the construction is as described with reference to FIGS. 1,2 and 3. The spacers 24 can be applied by a printed circuit technique.

The sensor illustrated in FIG. 4 operates in generally the same manner as for FIGS. 1,2 and 3. When a force (similar to the force F1,F2 or F3 in FIG. 1) is applied to the sensor of FIG. 4, the cover sheet 10 flexes and correspondingly flexes the appropriate one of the conductive layers 18 so that it is pressed into contact, between adjacent insulating discs 24, with the appropriate conductive layer 14 to produce an electrical signal.

Figure 5:
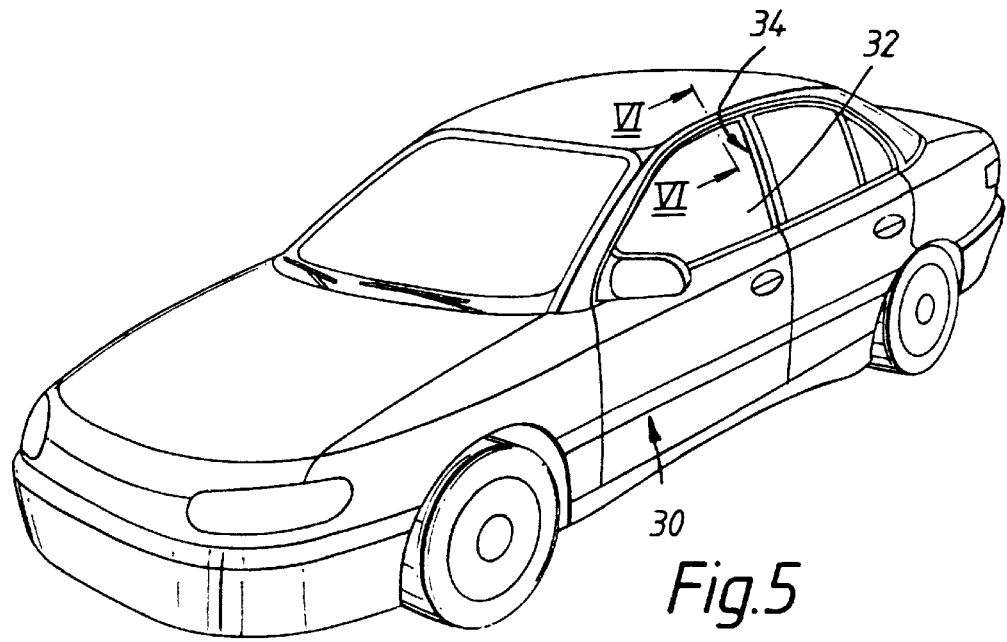
FIG. 5 is a perspective view of a motor vehicle showing where one of the window safety systems may be arranged.
Figure 6:
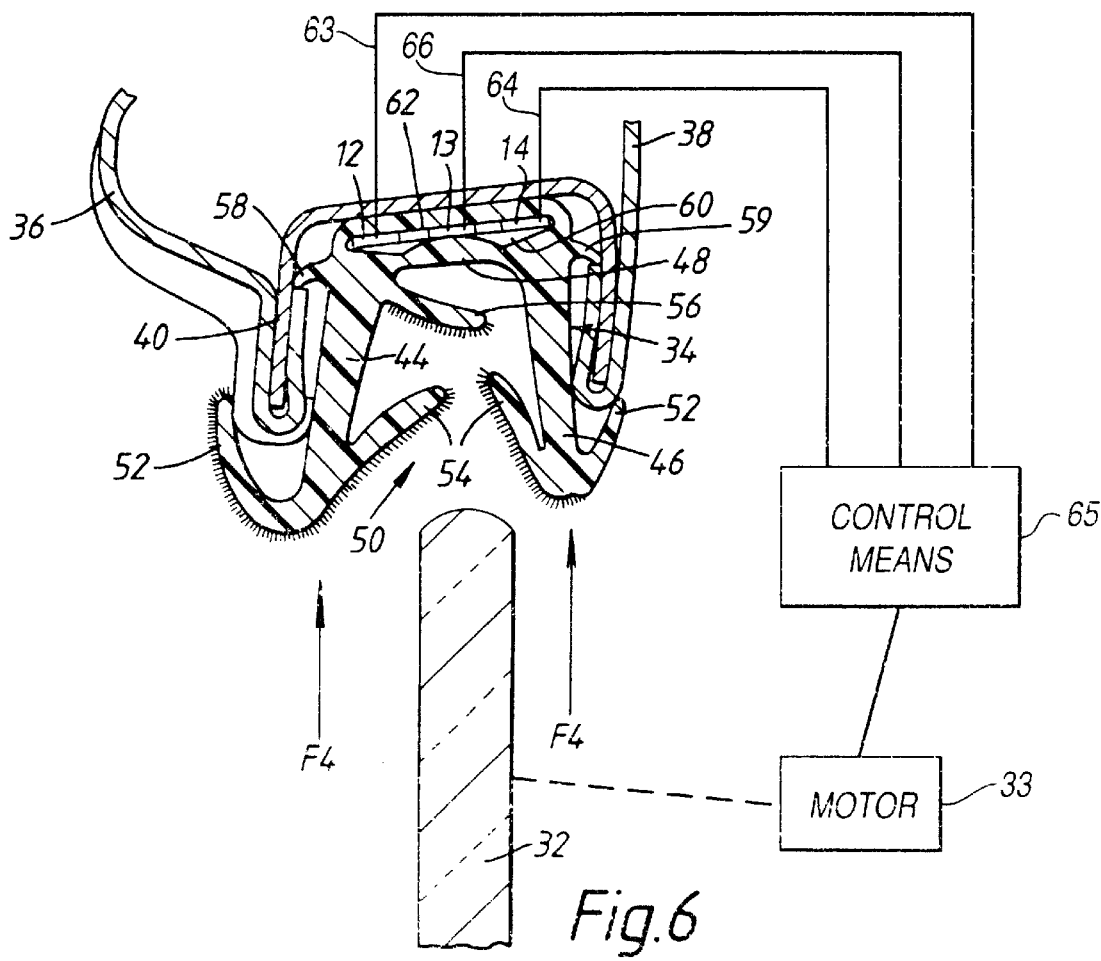
FIG. 6 is a cross-section on the line VI—VI of FIG. 5.

FIG. 5 shows a perspective view of a motor vehicle having a door 30 with a window pane 32 which is motor-driven by a motor 33. The window pane 32 slides up and down within a sealing and guiding channel indicated generally at 34. FIG. 6 illustrates in enlarged form how a sensor of the form shown in FIGS. 1, 3 and 4 may be incorporated into such a window channel in order to detect the presence of an obstruction in the window opening when the window pane is raised into the closed position.

FIG. 6 shows the inner and outer body panels 36 and 38 adjacent the door opening in the vehicle body. These body panels are bent over to support a stiff channel 40 (normally made of steel or similar material) forming the door frame. The channel 40 supports the window sealing and guiding channel 34 which is advantageously made from extruded rubber or plastics material defining side walls 44 and 46 integral with a base 48 and having a mouth 50 for receiving the window pane 32. The distal edges of the side walls 44,46 are bent over to provide lips 52 which extend over the bent-over edges of the body panels 36,38 to hide them and to seal against them. In addition, the side walls 44,46 provide integral lips 54 which resiliently make contact with the opposite sides of the window pane 32 as it enters the window channel and seal against the window pane. Side wall 44 is additionally provided with a lip 56 near the base 48 of the channel. The faces of the lips 54 and 56 which are contacted by the window pane 32 may be covered with flock or other low friction material.

The side walls 44,46 carry shoulders 58,59 which engage the distal edges of the bent-over body panels 36,38 to hold the window channel 42 in position in the door frame channel 40.

The base 48 of the window channel 34 is formed with a longitudinally extending hollow chamber 60 in which one of the sensors (indicated generally at 62 in FIG. 6) is positioned. The sensor 62 is illustrated only diagrammatically. The three sensing units 12,13 and 14 are indicated but their details are not visible in FIG. 6. The sensor 62 in FIG. 6 may be of the form shown in FIGS. 1 to 4.

As the window pane 32 rises, any obstruction in the window opening (e.g. a finger or other part of the human body) will be carried upwardly with the rising window pane and eventually be forced by the window pane into contact with the distal edge of one (or perhaps both) of the walls 44, 46. This is shown by the arrows F4. The resultant force will be transmitted by the appropriate side wall and applied to the appropriate sensing unit 12 or 14 of the sensor 62, causing an electrical signal to be produced in the manner explained in connection with FIGS. 1, 2, 3 and 4. This signal is applied through a connection 63 or 64 to appropriate detecting and control circuitry 65 to stop the motor 33 and thus to stop the movement of the window pane. This signal is used, through appropriate detecting and control circuitry, to stop the movement of the window pane immediately. Advantageously, the window pane is then caused to move in the downward direction.

When the window pane 32 enters the channel 34 through the mouth 50, it makes contact with the base 48 of the window channel and applies a force to the sensing unit 13 of the sensor 62, causing this unit to produce an electrical signal on a line 66 which is applied to the detecting and control circuitry 65. This signal is used to indicate that the window pane has completed its closing travel, and de-energises the motor.

The integral connecting portion 12A shown in the sensors of

FIGS. 3 and 4 enables the electrical continuity of the sensing units 12 and 14 to be continuously monitored from one end of the sensor 62. Thus, a small electrical current can be continuously passed from the end A of sensing unit 12 (see FIG. 3) to the end B of sensing unit 14. If any damage occur s to any part of sensing unit 12 or 14, this will result in interruption of this current and consequent detection of the failure. If the connecting portion 12A is omitted (as in the case of the sensor shown in FIG. 1), electrical continuity of each sensing unit 12, 14 is more difficult to monitor. It would be necessary to feed the current into one end of each such unit and to monitor it from the other end which would require electrical connections to each end of the window channel. Alternatively, a separate conductive connection could be added at the distal end of the sensor, corresponding to the connecting portion 12A. However, this would require an additional manufacturing step. The formation of the integral connecting portion 12A is very much simpler.

The incorporation of the sensing unit 13 in the sensor, for detecting the fully closed position of the window pane, is advantageous because it provides a simple and inexpensive means for detecting this state. It requires only a minor modification to the construction of the sensor. It is thus advantageous compared with known means for detecting the fully closed position of the window glass which may rely on detecting the increase in motor current when its rotation is stalled at the end of the travel of the window glass. However, the sensing unit 13 may be omitted if some other means of sensing the fully closed position of the window glass is provided.

Because the sensor 62 is embedded in the chamber 60, it is protected from damage. Because it is positioned below the base of the channel 34, any distortion of the material of the channel which its presence causes will not be externally visible. Its incorporation in a hollow chamber keeps the overall weight of the channel to a minimum.

What is claimed is:

1. A force-responsive longitudinally extending sensor, comprising a flexible longitudinally extending support having a predetermined width and being a substantially planar base, first and second force-responsive sensing means mounted on the support and spaced apart across the width of the support and extending therealong in substantially parallel configuration so as each to produce a respective signal in response to a respectively applied force, each force-responsive sensing means comprising first and second longitudinally extending electrically conductive means which are normally resiliently spaced apart from each other by longitudinally distributed electrically insulating means but which can be flexed into contact with each other against the resilience in response to an applied force, the electrically insulating means comprising a plurality of discrete insulating means spaced longitudinally apart within each sensing means, each insulating means comprising insulating means occupying a small proportion of the width of the respective sensing means.

2. A sensor according to claim 1, in which each insulating means extends across the width of each sensing means.

3. A sensor according to claim 1, in which the base comprises a flexible substantially planar base sheet.

4. A sensor according to claim 3, in which the flexible base sheet defines the overall width and length of the sensor.

5. A sensor according to claim 1, including a third force-responsive sensing means substantially the same as the first and second sensing means, the third sensing means being positioned on the base between the first and second sensing means.

6. A sensor according to claim 5, in which the third sensing means is positioned in the middle of the width of the sensor.

7. A sensor according to claim 1, including a substantially planar cover sheet of substantially the same size as and overlying the base with each sensing means positioned between the base and the cover sheet.

8. A sensor according to claim 1, in which each of the first and second sensing means is positioned immediately adjacent a respective longitudinal edge of the sensor.

9. A force-responsive longitudinally extending sensor, comprising a flexible longitudinally extending support having a predetermined width and being a substantially planar base, first and second force-responsive sensing means mounted on the support and spaced apart across the width of the support and extending therealong in substantially parallel configuration so as each to produce a respective signal in response to a respectively applied force, each force-responsive sensing means comprising first and second longitudinally extending electrically conductive means which are normally resiliently spaced apart from each other by longitudinally distributed electrically insulating means but which can be flexed into contact with each other against the resilience in response to an applied force, the electrically insulating means being applied by a printed circuit technique.

10. A force-responsive longitudinally extending sensor, comprising a flexible longitudinally extending support having a predetermined width and being a substantially planar base, first and second force-responsive sensing means mounted on the support and spaced apart across the width of the support and extending therealong in substantially parallel configuration so as each to produce a respective signal in response to a respectively applied force, each force-responsive sensing means comprising first and second longitudinally extending electrically conductive means which are normally resiliently spaced apart from each other by longitudinally distributed electrically insulating means but which can be flexed into contact with each other against the resilience in response to an applied force, one of the electrically conductive means being applied by a printed circuit technique to the base.

11. A force-responsive longitudinally extending sensor, comprising a flexible longitudinally extending support having a predetermined width and being a substantially planar base, and first and second force-responsive sensing means mounted on the support and spaced apart across the width of the support and extending therealong in substantially parallel configuration so as each to produce a respective signal in response to a respectively applied force, each force-responsive sensing means comprising first and second longitudinally extending electrically conductive means which are normally resiliently spaced apart from each other by longitudinally distributed electrically insulating means but which can be flexed into contact with each other against the resilience in response to an applied force, and including cross-connection means electrically connecting at least one of the electrically conductive means of one of the sensing means with one of the electrically conductive means of the other sensing means.

12. A sensor according to claim 11, in which the cross-connection means is positioned adjacent one of the longitudinal ends of the sensor.

13. A force-responsive longitudinally extending sensor, comprising a flexible longitudinally extending support having a predetermined width and being a substantially planar base, first and second force-responsive sensing means mounted on the support and spaced apart across the width of the support and extending therealong in substantially parallel configuration so as each to produce a respective signal in response to a respectively applied force, each force-responsive sensing means comprising first and second longitudinally extending electrically conductive means which are normally resiliently spaced apart from each other by longitudinally distributed electrically insulating means but which can be flexed into contact with each other against the resilience in response to an applied force, and a substantially planar cover sheet of substantially the same size as and overlaying the base with each sensing means positioned between the base and the cover sheet, one of the electrically conductive means being applied by a printed circuit technique to the base and the other electrically conductive means being applied by a printed circuit technique to the cover sheet.

14. A safety system for detecting an obstruction in a framed opening closable by a motor-driven slidable closure member, comprising a force-responsive longitudinally extending sensor, the sensor comprising a flexible longitudinally extending support having a predetermined width and being a substantially planar base, and first and second force-responsive sensing means mounted on the support and spaced apart across the width of the support and extending therealong in substantially parallel configuration so as each to produce a respective signal in response to a respectively applied force, the sensor being mounted on or adjacent the frame of the opening and so positioned that a said force is applied to at least one of the first and second sensing means of the sensor when an obstruction within the opening is carried towards the frame by the sliding closable member to produce a said signal, and control means responsive to the said signal to arrest motor-driven movement of the closable member.

15. A system according to claim 14, including a flexible guiding and sealing channel mounted on the frame of the opening for receiving an edge of the closure member which enters the mouth of the channel defined between substantially parallel longitudinally extending distal edges of the side walls of the channel and moves towards the base of the channel, the sensor being mounted adjacent the base of the channel so that the first and second sensing means being mounted adjacent the base of the channel so that the first and second sensing means are respectively positioned to receive a said force through a respective one of the side walls of the channel when an obstruction within the opening is carried towards the frame by the sliding closable member and becomes pressed against the distal edge of the side wall by the closing closable member.

16. A system according to claim 14, in which the framed opening is a window opening and the closure member is a pane of window glass.

17. A system according to claim 16, in which the window opening is a window opening in a vehicle.

18. A safety system for detecting an obstruction in a framed opening closable by a motor-driven slidable closure member, comprising a force-responsive longitudinally extending sensor, the sensor comprising a flexible longitudinally extending support having a predetermined width and being a substantially planar base, first and second force-responsive sensing means mounted on the support and spaced apart across the width of the support and extending therealong in substantially parallel configuration so as each to produce a respective signal in response to a respectively applied force, a third force-responsive sensing means substantially the same as the first and second sensing means and being positioned on the base between the first and second sensing means, and a substantially planar cover sheet of substantially the same size as and overlying the base with each sensing means positioned between the base and the cover sheet, the sensor being mounted on or adjacent to the frame of the opening and so positioned that a said force is applied to at least one of the first and second sensing means of the sensor when an obstruction within the opening is carried towards the frame by the sliding closable member to produce a respective said signal, first control means responsive to the said signal to arrest motor-driven movement of the closable member, and second control means responsive to a said signal produced by the third sensing means by a said force applied thereto by the closing closable member to arrest motor-driven movement thereof.

19. A system according to clam 18, including a flexible guiding and sealing channel mounted on the frame of the opening for receiving an edge of the closure member which enters the mouth of the channel defined between substantially parallel longitudinally extending distal edges of the side walls of the channel and moves towards the base of the channel, the sensor being mounted adjacent the base of the channel so that the first and second sensing means are respectively positioned to receive a said force through a respective one of the side walls of the channel when an obstruction within the opening is carried towards the frame by the sliding closable member, the second control means being responsive to the said force applied to the third sensing means by the distal edge of the closing closable member acting against the base of the channel.

20. A system according to claim 19, in which the sensor is mounted within a hollow chamber in the base of the channel.

* * * * *